(12) United States Patent
Radha (10) Patent No.: US 10,291,680 B2
(45) Date of Patent: May 14, 2019

(54) STREAMING MEDIA USING ERASABLE PACKETS WITHIN INTERNET QUEUES

(71) Applicant: Board of Trustees of Michigan State University, East Lansing, MI (US)

(72) Inventor: Hayder Radha, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 63 days.

(21) Appl. No.: 15/386,313

(22) Filed: Dec. 21, 2016

(65) Prior Publication Data

US 2017/0187778 A1 Jun. 29, 2017

Related U.S. Application Data

(60) Provisional application No. 62/387,120, filed on Dec. 23, 2015.

(51) Int. Cl.
| | |
|---|---|
| *H04L 29/06* | (2006.01) |
| *H04L 12/801* | (2013.01) |
| *H04L 12/823* | (2013.01) |
| *H04L 12/841* | (2013.01) |
| *H04N 21/4385* | (2011.01) |

(Continued)

(52) U.S. Cl.
CPC ...... *H04L 65/607* (2013.01); *H04L 29/06027* (2013.01); *H04L 47/19* (2013.01); *H04L 47/28* (2013.01); *H04L 47/32* (2013.01); *H04N 21/8456* (2013.01); *H04L 2012/6483* (2013.01)

(58) Field of Classification Search
CPC ........ H04L 29/06027; H04L 29/06176; H04L 47/10; H04L 47/19; H04L 47/2416; H04L 47/28; H04L 47/32; H04L 47/326; H04L 65/601; H04L 65/607; H04L 65/608;

(Continued)

(56) References Cited

U.S. PATENT DOCUMENTS

| | | | | |
|---|---|---|---|---|
| 6,219,352 B1 * | 4/2001 | Bonomi | ............ | H04Q 11/0478 370/417 |
| 7,020,823 B2 * | 3/2006 | Bushmitch | ............ | H03M 13/05 375/E7.091 |
| 7,151,744 B2 * | 12/2006 | Sarkinen | ................. | H04L 45/00 370/230 |

(Continued)

*Primary Examiner* — Alpus Hsu
(74) *Attorney, Agent, or Firm* — Harness, Dickey & Pierce, PLC (57) ABSTRACT

The streaming media encoding and routing system employs an encoder circuit that constructs a streaming media sequence as a plurality of sequential frames, each frame comprising a plurality of segments. The encoder circuit has a processor that is programmed to place media information into the plurality of segments of each frame according to a predefined priority and further programmed to order the sequence of said segments within each frame such that the segments are progressively priority-ranked from high priority to low priority to define an EPIQ-encoded packet. A processor tests an incoming packet to determine whether it is EPIQ-encoded. The processor reduces network congestion when the received quality of service data indicates presence of network congestion by: (a) selectively and progressively erasing segments within an incoming packet beginning with a lowest-ranked priority segment if the incoming packet is determined to be EPIQ-encoded; and (b) dropping the entire incoming packet if the incoming packet is determined not be EPIQ-encoded.

12 Claims, 6 Drawing Sheets

(51) Int. Cl.
*H04N 21/845* (2011.01)
*H04L 12/64* (2006.01)

(58) Field of Classification Search
CPC .............. H04L 65/80; H04N 21/64738; H04N 21/64792; H04N 21/845; H04N 21/8456
See application file for complete search history.

(56) References Cited

U.S. PATENT DOCUMENTS

| | | |
|---|---|---|
| 8,505,059 B2 | 8/2013 | Cho et al. |
| 8,792,744 B2 | 7/2014 | Conger et al. |
| 9,445,136 B2* | 9/2016 | Gillies ............... H04N 21/8456 |
| 9,626,364 B2* | 4/2017 | Mani ................. G06F 17/30017 |
| 9,681,147 B2 | 6/2017 | Mahfoodh et al. |
| 2002/0147834 A1* | 10/2002 | Liou ....................... H04L 29/06 |
| | | 709/236 |
| 2005/0076136 A1* | 4/2005 | Cho .................. H04L 29/06027 |
| | | 709/231 |
| 2007/0147371 A1 | 6/2007 | Radha et al. |
| 2007/0242744 A1 | 10/2007 | Radha et al. |
| 2008/0025204 A1 | 1/2008 | Radha et al. |
| 2008/0037420 A1* | 2/2008 | Tang .................... H04K 1/1607 |
| | | 370/229 |
| 2008/0037434 A1 | 2/2008 | Radha et al. |
| 2008/0117904 A1 | 5/2008 | Radha et al. |
| 2009/0133123 A1 | 5/2009 | Radha et al. |
| 2009/0190492 A1 | 7/2009 | Khayam et al. |
| 2009/0199064 A1 | 8/2009 | Radha et al. |
| 2013/0084020 A1 | 4/2013 | Conger et al. |
| 2014/0301388 A1* | 10/2014 | Jagadish ............. H04L 45/7453 |
| | | 370/389 |

* cited by examiner

STREAMING MEDIA USING ERASABLE PACKETS WITHIN INTERNET QUEUES

CROSS REFERENCE TO RELATED APPLICATIONS

This application claims the benefit of U.S. Provisional Application No. 62/387,120, filed on Dec. 23, 2015. The entire disclosure of the above application is incorporated herein by reference.

FIELD

This disclosure relates generally to multimedia and video streaming over networks. More particularly, the disclosure relates to an encoding and packet routing circuit that encodes packets as progressively priority-ranked segments and subjects those packets to partial erasing as a mechanism to control throughput while supporting quality-of-experience requirements.

BACKGROUND

This section provides background information related to the present disclosure which is not necessarily prior art.

HTTP-based Adaptive Streaming (HAS) has emerged as the dominant framework for video streaming mainly due to its simplicity, firewall friendliness, and ease of deployment. HAS solutions rely on popular protocols, such as HTTP and TCP, and on standard network services supported currently by the best-effort Internet. An important example of HAS is the well-known and popular MPEG Dynamic Adaptive Streaming over HTTP (DASH) standard that is supported by many major industry players. Consequently, HAS has been receiving a great deal of attention, and many efforts have been proposed toward improving its performance and addressing many of its technical challenges.

Some of the primary challenges that have been highlighted and studied by recent efforts include HAS's inefficiency in using network resources, and its inherent reliance on TCP, which leads to key issues such as delays and a highly undesirable oscillatory behavior that changes the streamed video bitrate and its quality profile rather frequently. Recent studies have proposed improving the performance of HAS technology by improving the rate adaption algorithm and its approach for estimating available bandwidth. Meanwhile, the popularity of multimedia applications and the unprecedented growth of video traffic over the best-effort Internet have arguably aggravated DASH's challenges and led to a noticeable increase in the frequency and severity of network congestion events. All of these challenges and issues have resulted in well-documented problems in degrading the end user's Quality-of-Experience (QoE). More importantly, and as highlighted recently by key marketing studies, continued degradation in consumer's QoE could lead to a negative impact on the overall HAS and Over-The-Top (OTT) video market in a very significant way.

It is well known that delivery of optimal video over variable bandwidth networks, such as the Internet, can be achieved by exploiting the multi-priority nature of video content. A primary example of a video-streaming framework that can achieve consistent high-quality video delivery is based on multi-priority queuing of the video packets. In particular, DiffServ has emerged as the leading multi-priority video queuing solution. Under DiffServ, the video stream is divided into sub streams that are marked with different dropping precedence. As packets travel in the DiffServ network, low priority packets are dropped during congestion. To reduce queue management overhead and overall network complexity, the number of DiffServ priority queues is limited to only a few.

Another related framework is based on single network node that utilizes Active Queue Management (AQM) in conjunction with Priority Dropping, or AQM-PD. The single node may use single or multiple queues. Using a single queue with a priority dropping mechanism causes significant overhead when compared with HAS and DiffServ. When multi queue is used it is limited to few to reduce complexity. Consequently, despite the broad support for DiffServ within network routers, it has not been utilized in a significant way, and certainly not at the level that HAS based solutions have been employed and used.

SUMMARY

This section provides a general summary of the disclosure, and is not a comprehensive disclosure of its full scope or all of its features.

In this disclosure, we introduce a novel video streaming framework that is capable of delivering optimal and consistent quality-of-experience similar to the quality promised by DiffServ while requiring minimal low-complexity network support similar to the support provided by standard and popular AQM algorithms over the best-effort Internet. We refer to our framework as Erasable Packets within Internet Queues (EPIQ).

There are two important aspects of the disclosed EPIQ framework. First, EPIQ is based on a novel packetization of the video content in a way that exploits the inherent multi-priority nature of video. In short, each EPIQ packet consists of multiple segments, and where each segment consists of video data of a different priority (see FIG. 1). The highest priority segment is placed next to the packet header, whereas the lowest priority segment is placed at the tail of the packet. For example, an EPIQ packet can include Intra-coded frame (I-frame) bytes next to the header, followed by Prediction frame (P-frame) bytes, and then Bi-directional (B-frame) bytes at the tail of the packet.

This novel packetization enables the second major aspect of the proposed EPIQ framework. Under congestion, a simple AQM mechanism can be realized where a network router could drop (or erase) only small portions located toward the tail of EPIQ packets instead of dropping complete packets as traditionally done by current routers. Hence, EPIQ enables a novel partial erasing paradigm within the network. Thus, we refer to an EPIQ packet as Partially Erasable Packet (PEP).

Therefore, according to one aspect the disclosed streaming media encoding and routing system comprises an encoder circuit that constructs a streaming media sequence as a plurality of sequential frames, each frame comprising a plurality of segments. The encoder circuit has a processor that is programmed to place media information into the plurality of segments of each frame according to a predefined priority and further programmed to order the sequence of said segments within each frame such that the segments are progressively priority-ranked from high priority to low priority to define an EPIQ-encoded packet.

The system further includes a circuit that receives quality of service data representing network congestion. A processor is programmed test an incoming packet to determine whether it is EPIQ-encoded as collections of progressively priority-ranked segments. The processor is further programmed to reduce network congestion when the received quality of service data indicates presence of network congestion by:

(a) selectively and progressively erasing segments within an incoming packet beginning with a lowest-ranked priority segment if the incoming packet is determined to be EPIQ-encoded; and (b) dropping the entire incoming packet if the incoming packet is determined not be EPIQ-encoded.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DESCRIPTION OF PREFERRED EMBODIMENTS

Example embodiments will now be described more fully with reference to the accompanying drawings.

Traditional random packet dropping by the network could cause severe degradation in the quality of user experience of streamed video applications. This quality-of-experience degradation is usually manifested by frequent video-freeze events. A root cause of this phenomenon is the well-known dependency among video packets and the inherent multi-priority nature of compressed video content.

Figure 1:
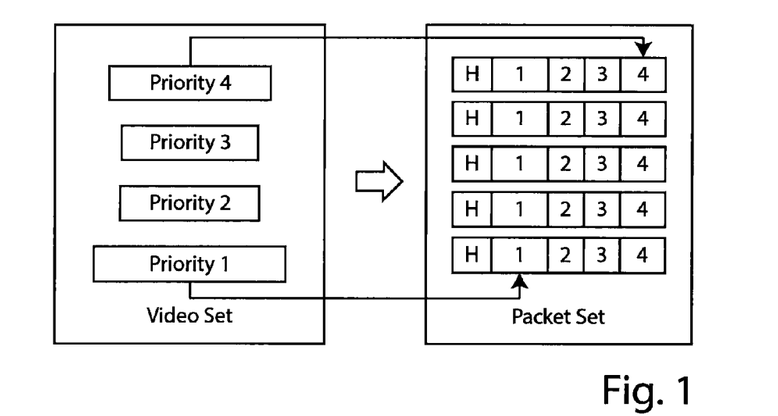
FIG. 1 is a chart show the mapping of multi-priority video content from an EPIQ Video Set (left) to Partially Erasable Packets of an EPIQ Packet Set (right).

The disclosed EPIQ framework mitigates these issues through a novel packet design that we call a Partially Erasable Packet (PEP) structure. A PEP structure is conceptually simple, and it is illustrated in FIG. 1. For any set of compressed video frames, we identify different levels of priority for the content of such set. These levels could correspond to different picture types (i.e., I, P, and B frames) of a non-scalable video stream; or, they could correspond to different layers of a scalable video frame (i.e., a base-layer and multiple enhancement layers); or, a combination of both. Whatever the case, a video stream can be divided into different priority levels as shown in FIG. 1. Under EPIQ, we partition the video content of each priority-level and distribute that content into multiple PEP packets. More importantly, we place the highest priority content next to the header while placing the lowest priority content at the tail end of the packet. All other priority levels are placed progressively between the highest and lowest priority level content between the header and the tail of the packet as shown in FIG. 1.

For the sake of clarity in this disclosure, we present the following two definitions associated with the proposed EPIQ framework and PEP structure:

EPIQ Video Set (EVS) represents a set of prioritized video content. In general, EVS could represent any set of video frames that can be partitioned into multiple priorities. For example, an EVS can correspond to a GoP for non-scalable video. EVS could also correspond to a single scalable frame that includes multiple layers of a scalable video stream. Hence, an EVS represents a video content that can be partitioned into multiple priority levels (the left side of FIG. 1).

EPIQ Packet Set (EPS) represents the set of PEP packets that carry the content of one EVS. Thus, we divide each EVS priority level into different segments that we distribute among the packets of an EPS. Although not necessarily the case, in FIG. 1, each EVS priority level is divided into equal-size segments, which are uniformly distributed among the EPS packets.

The novelty and power of the proposed EPIQ packet structure is that it enables a simple and best-effort-like queue management mechanism while mimicking and achieving the benefits of multi-priority queue management approaches. During congestion, and instead of dropping a complete packet, a router can now simply erase an arbitrary portion of a PEP packet starting from its tail. It is important to note that the router does not have to be aware of the number of priority segments or their sizes within a PEP packet. Based on a (random early detection) RED-like AQM algorithm, the router can decide the size of the portion to be dropped from any randomly selected set of PEP packets. Hence, this partial erasing paradigm leads to dropping low-priority content and preserving high-priority content. Consequently, an EPIQ streaming solution can achieve the performance of complex multi-queue systems while maintaining the low-complexity of best-effort solutions without the need to manage a large number of queues or maintain the state information of a large number of flows.

The only added complexity for an EPIQ-based solution is that the router needs to simply identify if the packet has a traditional structure or if it is a PEP packet. This requirement can be readily achieved, for example, by using the IPv4 header's differentiated services code point (DSCP) and flag fields. Also, to increase the speed of the packets selection process, the router could maintain a list that points to the starting locations of the PEP packets in the queue. Finally, it is worth noting the following. For a given EPIQ packet set, the EPIQ sender usually generates equal-priority packets since each PEP packet contains the same priority levels. This notion reinforces the need for single queue AQM management since all PEP packets are, in general, equally important.

Hardware Implementation

Figure 4:
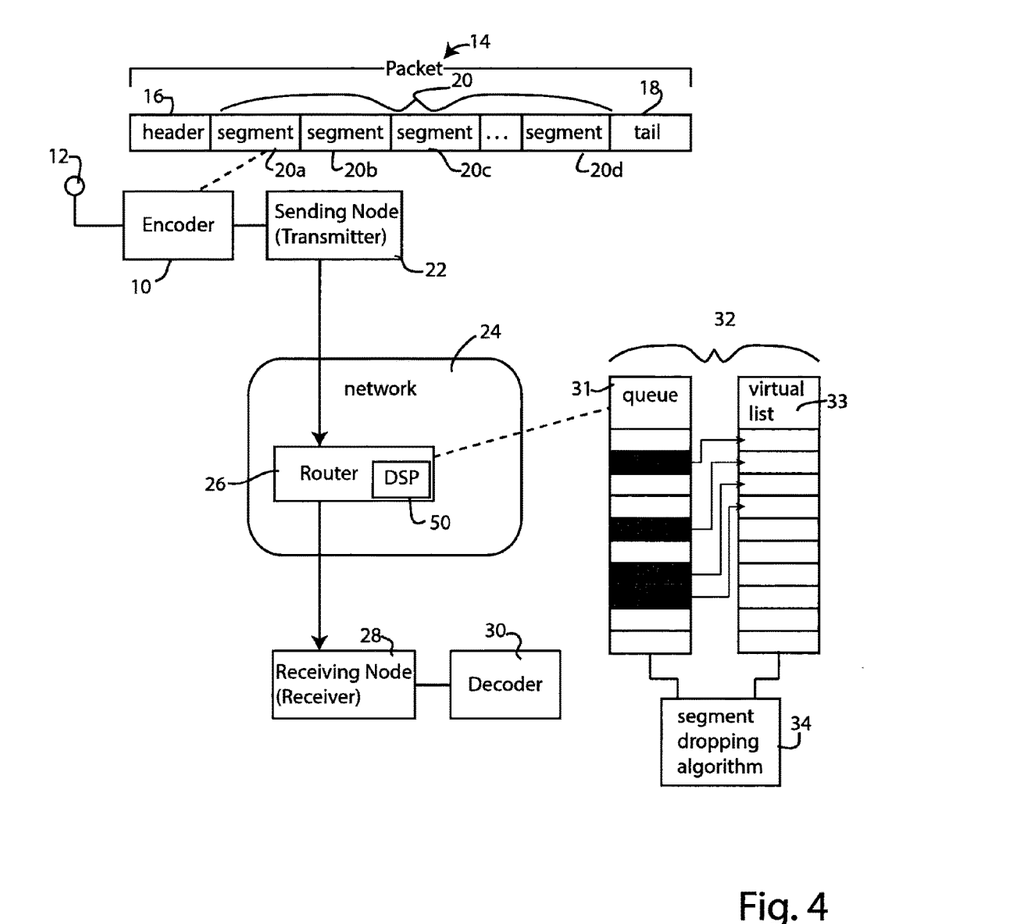
FIG. 4 is a circuit diagram of one embodiment of a system utilizing the EPIQ video streaming framework.

FIG. 4 shows a hardware implementation of the disclosed system. For purposes of illustration, a streaming video system has been illustrated. However, it will be appreciated that other media sources may also be utilized. The encoder 10 receives at its input 12 the video data which are then encoded into packets each comprising a plurality of segments sandwiched between a header and a tail according to the EPIQ encoding framework discussed herein. In this regard an exemplary packet 14 has been illustrated as including header 16, tail 18 and a plurality of segments 20 there between. The encoder organizes the segments into a sequence of decreasing priority. Thus segment 20a is the highest priority while segment 20d is the lowest priority.

The encoder circuit 10 supplies the encoded packets as a data stream to the sending node 22, which may be a transmitter circuit or other suitable electronic circuit for placing packets onto the network 24. In this regard network 24 may include many nodes or routers (one exemplary router 26 has been illustrated here). The network nodes pass the data stream through a sequence of node-to-node transmission hops until the stream reaches the receiving node 28. The receiving node may be a receiver circuit or other suitable electronic for receiving the packets from the node or router to which it is in direct communication. Attached to the receiving node 28 is a decoder circuit 30 that reverses the encoding action performed by the encoder circuit and thus reconstitutes the video data that was supplied to input 12 of the encoder, minus any loss in signal quality as a result of traversing the network 24.

In the disclosed system the router 26 comprises a processor 50 that has been programed to perform a special function of detecting packets that have been encoded according to the EPIQ encoding framework, and selectively erasing portions of the segments comprising those packets as required to meet current throughput constraints as discussed herein. The router 26 is programmed to accept the incoming packets in a queue 31, which may be stored in the non-transitory memory 32 attached to the router's processor 50. These packets may be sequentially stored in the memory, as illustrated. Packets that have been encoded with the EPIQ encoding are suitably flagged as illustrated diagrammatically in FIG. 4 as packets labeled "EPIQ". The router's processor is programmed to construct in memory 32 a virtual list of the packets flagged as being EPIQ encoded. In FIG. 4 this virtual list 33 stores the flagged packets sequentially.

The router's processor is programmed with a segment dropping algorithm 34 that assesses the current throughput capability of the network path by which the packets are being transmitted. The segment dropping algorithm 34 selectively erases packet segments, beginning with the lowest priority segments, until throughput constraint is alleviated. Note that the selective erasing of lower priority EPIQ segments is different from dropping the entire packet as would be done conventionally. However, when the router receives a packet that is not EPIQ encoded, the router simply drops that entire packet if throughput capability of the network path so dictates.

Thus when the data stream is supplied to the receiving node 28, the resulting data stream will comprise only (a) packets that were untouched by the router 26—these may be standard packets or EPIQ packets, and (b) any EPIQ packets that were partially erased by the router. Standard packets that were dropped by the router are naturally not part of the data stream supplied to the receiving node.

Stochastic Model

In this section, we develop an analytical model to assess and demonstrate the performance of the disclosed system. This analytical model is intended to provide an insight into how our system performs in comparison with traditional best-effort streaming (e.g., streaming using HAS or RTP). More importantly, we further compare our system with the ideal case of achieving channel capacity. Our analysis is applied to an EPIQ packet set (EPS) that carries the content of multi-priority video. An EPIQ packet set can represent the content associated with a single scalable video frame that is mapped onto this packet set. Or, an EPS set can carry the content of a complete group of pictures (GoP) of scalable or non-scalable frames.

In general, successful decoding of low-priority data requires successful delivery and decoding of higher-priority data; otherwise, lower-priority data become useless even if they are delivered. Hence, regardless of the form of an EPIQ packet set, it is crucial to evaluate the utility of the data delivered. Thus, our objective here is to quantify the performance of our system by measuring the utility of the delivered data to the decoder. This is crucial for achieving optimal video delivery since reducing congestion by dropping video content should have minimal detrimental effect on video quality.

Figure 2:
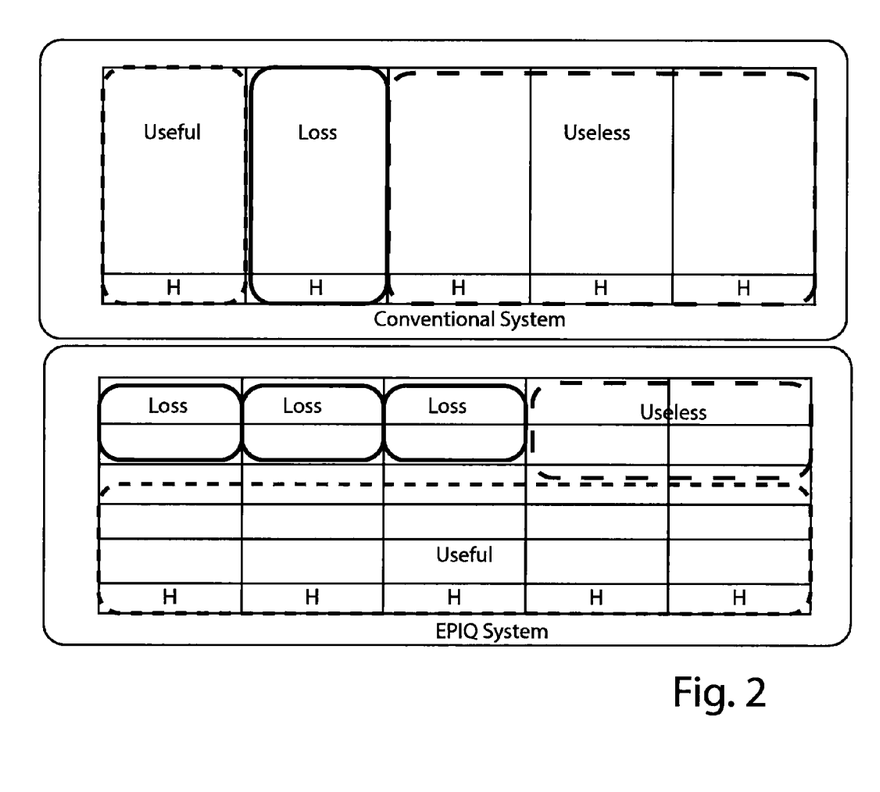
FIG. 2 is a packet mapping diagram comparing our EPIQ packet set with a conventional packet set.

Let p be the probability of dropping a packet within the network under traditional best-effort streaming (e.g., using HAS or RTP). If the average size of a packet is S bytes, then p is also the probability of dropping S bytes. Under the disclosed EPIQ framework, p becomes the probability of erasing the same number (S) bytes from PEP packets in the network queue. Hence, in either case, p represents the average loss rate. For our analysis, we use a set of parameters that are outlined and described in Table (1). Further, FIG. 2 shows an example for mapping a traditional scalable video frame with $N_p$ packets into an EPIQ packet set using the same number $N_p$ of Partially Erasable Packets (PEPs).

TABLE 1

Stochastic model parameters

| Parameter | Description |
|---|---|
| $N_p$ | Number of packets in an EPIQ packet set (EPS). For consistency, this is the same number of packets used to packetize the corresponding video data according to a traditional approach. |
| S | Size of each packet in bytes. This can be the average size of a packet when the packets have variable sizes. Or, it can be a constant if the same size is used for all transmitted packets. |
| $N_E$ | Number of packets (from an EPIQ packet set) that are subjected to partial erasing. |
| δ | Number of bytes that are erased (or "deleted") from each of the $N_E$ Partially Erasable Packets (PEPs) of an EPIQ packet set. Note that δ varies from one EPS to another. |
| $\bar{δ}$ | The expected value of δ. |
| $B_T$ | Total number of bytes in an EPIQ packet set: $B_T = N_p \cdot S$ |
| $B_{lost}$ | The total number of bytes that are erased (lost) by a router due to a congestion event. Under EPIQ, this erasing takes place over NE Partially Erasable Packets (PEPs). $B_{lost} = δ \cdot N_E$ For consistency, $B_{lost}$ also represents the total number of bytes lost due to packet dropping under a traditional approach. |
| $B_{un}$ | The number of bytes of an EPS that become useless (or unused by the video decoder) due to a loss/erasing event. |

TABLE 1-continued

Stochastic model parameters

| Parameter | Description |
|---|---|
| $B_U$ | Useful data, measured by number of bytes from an EPIQ packet set, that are used by the video decoder: $B_U = B_T - (B_{lost} + B_{un})$ |

Let $B_T$ be the size of one EPIQ packet set in bytes. Since S is the packet size in bytes, for both the traditional and EPIQ packetization we have the following:

$$B_T = N_p \cdot S \quad (1)$$

Note that Eq. (1) is valid for both our proposed solution and a conventional system. One of the important aspects of our proposed analysis is that it maintains consistency in terms of the amount of lost data in comparison with a conventional system. To capture this consistency, let $B_{lost}$ be the number of bytes that would be lost in a conventional system due to packet dropping. Now, if the probability of dropping a packet is p, then the expected value of the number of bytes to be lost within an EPIQ packet set can be written as:

$$E[B_{lost}] = p \cdot B_T \quad (2)$$

Similarly, we use $B_{lost}$ to represent the total number of bytes lost from an EPIQ packet set due to partial erasing. Note that in a conventional system, $B_{lost}$ corresponds to the number of bytes lost due to dropping complete packets; while in our disclosed solution Blost represents the number of bytes lost due to erasing portions of multiple packets. Either case, we use the same value for $B_{lost}$ for the sake of consistency and fairness when comparing the two solutions (traditional and EPIQ).

To capture our partial erasing (PE) process for distributing the loss $B_{lost}$ bytes over multiple packets, we define two parameters $N_E$ and $\bar{\delta}$. FIG. 2 shows an illustrative example, where $N_E=3$ packets have been randomly selected by the network for partial erasing. In general, each selected packet that is subjected to partial erasing encounter a different level of erasing. Note that the figure shows the $N_E=3$ selected packets are contiguous. This is not necessarily the case; contiguous packets are shown in the figure mainly for ease of presentation. Also, the dropped portions are arbitrary, and they do not have to coincide with the border of video slices within the selected PEP packets. While there are many PEP packets in the queue, the EPIQ AQM algorithm can select any number of PEP packets. As our analysis and simulations will demonstrate, optimum video quality can be achieved by selecting the maximum possible number of packets in the queue for partial erasing. This process, however, leads to a variable number ($N_E$) of packets (from a given EPIQ packet set) that encounter partial erasing. Consequently, when congestion occurs at the network, then at the receiver, we may observe anywhere from a single packet to a maximum number of $N_p$ packets that have suffered from partial erasing for a given EPIQ packet set. Hence, under congestion, is a uniform random variable with a probability mass function $1/N_p$.

The second parameter in this analysis, $\bar{\delta}$, represents the average number of bytes that are erased from the $N_E$ packets selected for partial erasing. Consequently, for an EPIQ based loss event, on average, we have the following:

$$\bar{\delta} = E\left[\frac{B_{lost}}{N_E}\right] \quad (3)$$

Now, we would like to compute the amount of useful data received by the decoder. Let $B_U$ be the useful data (measured in bytes) recovered from one EPIQ packet set (EPS), which consists of $N_p$ PEP packets. As illustrated in FIG. 2, the useful portion is the lower part of PEP packets that belong to the same EPIQ packet set. Hence, under this model, on average, erasing a set of $\bar{\delta}$ bytes from the $N_E$ packets that have been subjected to partial erasing will, on average, cause $\bar{\delta}$ bytes from all other ($N_p - N_E$) packets of an EPIQ packet set to become useless. Consequently, we have the following:

$$E[B_U] = B_T - \bar{\delta} \cdot N_p = B_T - E\left[\frac{B_{lost}}{N_E}\right] \cdot N_p \quad (4)$$

The two random variables, $B_{lost}$ (number of lost bytes from an EPIQ packet set) and $N_E$ (number of packets selected randomly from an EPIQ packet set for partial erasing), can be considered uncorrelated due to the following argument. As explained before, when congestion occurs, the AQM system will erase S bytes from the PEP packets in the network queue. This number of erased bytes, which leads to $B_{lost}$ of bytes from an EPIQ set, is independent of how many packets are selected for erasing within the network. Consequently, we have:

$$E\left[\frac{B_{lost}}{N_E}\right] = E\left[\frac{1}{N_E}\right] \cdot E[B_{lost}] \quad (5)$$

Hence, $$E[B_U] = B_T - E\left[\frac{1}{N_E}\right] \cdot E[B_{lost}] \cdot N_p \quad (6)$$

Or, $$E[B_U] = B_T\left(1 - E\left[\frac{1}{N_E}\right] \cdot p \cdot N_p\right) \quad (7)$$

Using the fact the $N_E$ is a uniform random variable, $$E\left[\frac{1}{N_E}\right]$$

$$E\left[\frac{1}{N_E}\right] = \frac{1}{N_p}\sum_{i=1}^{N_p}\frac{1}{i} \quad (8)$$

(8) can be rewritten as $$E[B_U] = B_T\left(1 - p \cdot \sum_{i=1}^{N_p}\frac{1}{i}\right) \quad (9)$$

Using $$E\left[\frac{1}{X}\right] \geq \frac{1}{E[X]},$$

an upper limit can be found for the average system performance. Hence, Eq. (6) can be rewritten as:

$$E[B_U] \leq \overline{B}_U^{bound} = B_T - \frac{E[B_{lost}]}{E[N_E]} \cdot N_p \quad (10)$$

Or, $$E[B_U] \leq \overline{B}_U^{bound} = B_T\left(1 - \frac{p \cdot N_p}{E[N_E]}\right) \quad (11)$$

To compare our model with Best Effort (BE) video transmission, we must measure the usefulness of the same amount of data in both models. Furthermore, we address the abstract video scenario where there are dependencies among the video packets. In particular, when considering a set of video packets that are being transmitted sequentially, then we assume that later packets in the sequence are dependent on earlier ones in that set. Consequently, losing any packet will deem subsequent ones useless under such model. Under EPIC, $E[B_U]$ represents the useful data, measured by the number of bytes from an EPIQ packet set, that are used by the video decoder. On the other hand, in Best Effort, we measure the usefulness per a corresponding video content and compare the results with our system. Also, recall that $N_p$ is the number of EPS packets or corresponding packets needed to packetize the video data carried by an EPS according to a traditional approach. In addition, EPIQ and BE models use p as the average loss ratio as we stated earlier. Therefore, we have the necessary elements to compare both models. We also show the maximum theoretical achievable usefulness, which is the channel capacity. Hence, the maximum theoretical expected usefulness is:

$$E[B_U]_{Capacity} = N_p(1-p) \quad (12)$$

In Eq. (9), our proposed solution achieves channel capacity when $N_p=1$. Hence, minimizing the EPS size improves the performance of our system. In practice, however, we need to employ an EPIQ packet set with multiple packets as discussed below. One can develop a model for Best Effort (BE) video packets with sequential dependency. The expected useful information for such model is:

$$E[B_U]_{BE} = \frac{1-p}{p}(1-(1-p)^{N_p}) \quad (13)$$

To further normalize our model, we define a utility function U:

$$U = \frac{E[B_U]}{E[B_U]_{Capacity}} \quad (14)$$

The utility function represents the ratio of the useful information received relative to channel capacity. For our EPIQ model, the utility function is $$U_{EPIQ} = \frac{\left(1 - p \cdot \sum_{i=1}^{N_p} \frac{1}{i}\right)}{1-p} \quad (15)$$

The utility function for the Best Effort model becomes:

$$U_{BE} = \frac{1-(1-p)^{N_p}}{N_p \cdot p} \quad (16)$$

Figure 3:
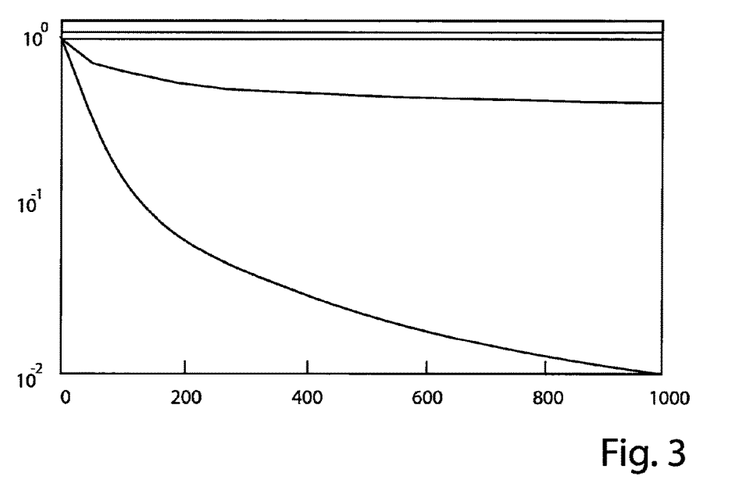
FIG. 3 is a series of graphical curves plotting utility as a function of video-set size (p=0.1).

FIG. 3 shows a comparison of the utility as a function of the number of packets in an EPIQ packet set ($N_p$) for both the EPIQ and BE models. For the case of EPIQ, we show the two cases expressed by Eq. (9) and Eq. (11), respectively. It is clear that our system delivers significantly higher level of useful data to the receiver when compared with BE. For example, EPIQ at $N_p=20$ achieves 74% utility while BE only achieves 40% utility. Another example is when $N_p=100$, EPIQ achieves 55% while BE could only maintain 10%. Consequently, EPIQ can achieve significantly higher level of performance over traditional best effort transmission while both systems select random data to be discarded within the network.

System Implementation

To implement the concepts discussed in previous sections, we use Active Queue Management (AQM) that exists in the network nodes, but with certain important improvements. To complement our improved AQM we also implement a new rate control algorithm. In the discussion below we first explain our improved AQM algorithm, followed by an explanation of our new rate control algorithm in the section labeled Transmission Rate Control.

Active Queue Management

Despite the many AQM approaches that have been proposed, only a few have been incorporated in Internet routers and are being used in practice. Hence, we are interested in focusing on employing and improving upon existing AQM algorithms and concepts that have been used in practice in conjunction with the proposed EPIQ framework. In particular, our disclosed AQM algorithm is an improvement upon the popular Random Early Detection (RED) algorithm. We call our approach EPIQ Random Early Detection (EPIQ-RED). It is important to note that we use the Byte version (Byte mode) of the RED algorithm.

Under RED, the AQM algorithm drops a packet entering the queue with a certain probability when the queue size operates within certain thresholds. Here, $p_a$ represents the AQM algorithm packet dropping probability, and $q_{avg}$ is the queue average size in bytes. The $min_{th}$ and $max_{th}$ parameters are the RED maximum and minimum thresholds, respectively. To calculate the dropping probability $p_a$, we modified the original RED algorithm by fixing the $max_p$ parameter of RED to 1. This leads to:

$$p_a = \frac{(q_{avg} - min_{th})}{max_{th} - min_{th}} \quad (17)$$

The advantage for fixing the parameter $max_p$ is to have a continuous linear dropping probability. Discontinuity in the dropping probability has a negative effect on the performance. In our case, we introduce simple modifications to the original RED, where we take into consideration the proposed EPIQ system requirements in terms of delivering optimal video performance while maintaining RED automation.

One key EPIQ-RED parameter is N, which is related to (but not the same as) the parameter $N_E$ described in the Stochastic Model section above. Here, N represents the number of PEP packets that are selected randomly from the queue for partial erasing. These N packets that are selected for partial erasing might belong to multiple EPIQ packet sets that belong to multiple users. On the other hand, $N_E$, which was employed by our analysis in the Stochastic Analysis section, is the number of packets within a single EPIQ packet set that suffer from partial erasing (as observed by a given single receiver). Hence, under EPIQ-RED, N PEP packets, which may belong to one or more EPIQ packet sets, are randomly selected from the queue for partial erasing.

As explained earlier, for an optimal EPIQ performance, we need to have the value of N as large as possible. Consequently, it is possible that all the PEP packets that belong to the same EPS can be selected. Assuming that we have different EPIQ packet sets with different sizes in the queue, under EPIQ-RED, we set N to some maximum value $N_{max}$. Here, $N_{max}$ can be thought of as the maximum number of packets of an EPIQ packet set. However, in cases when $N_{max}$ is larger than the current number of PEP packets in the queue, N is set to the current number of EPIQ packets in the queue $q_{EQ}$. Hence, $$N = \min(q_{EQ}, N_{max}) \quad (18)$$

Recall that PEP packets have a size of S bytes. Although it is possible to erase more than one packet size S of bytes at a time, we use the RED standard queue management procedure where one packet is dropped (or erased) at a time. This is also important to achieve fairness with different non-EPIQ flows. The amount of data that are erased from each of the N selected packets is represented by $\delta$:

$$\delta = \frac{S}{N} \quad (19)$$

It is important to note that in our design of EPIQ-RED, we take into consideration that the network queues might have a mix of EPIQ and traditional packets. Hence, to accelerate the process of packet erasing, EPIQ-RED has to maintain the location and the number of EPIQ packets in the queue. A virtual list can be used to point to the location of the EPIQ packets in the queue. The minimum number of packets for RED threshold $\min_{th}$ is conventionally set to a number of bytes equivalent to five packets. However, and since we are targeting to spread the erasing process over as many EPIQ packets as possible, a small queue will affect EPIQ transmitted video quality as shown in Eq. (18)-(19). Thus, we set the minimum threshold $\min_{th}$ as the maximum between the RED standard recommended threshold and the average value of the EPIQ packet set size $\bar{N}_p$.

On the other hand, a large queue will cause long delays. Thus limiting the number of packets in the queue reduces packet latency and prevents buffer-bloating. Hence, we set $\max_{th}$ as the minimum between: (a) The number of packets in the queue $N_Q(\tau)$ that is equivalent to a $\tau$=0.2 second packet delay; and (b) Twice the maximum size $N_{max}$ of an EPIQ packet set. The motivation for choosing twice the size of $N_{max}$ is because EPIQ video content will most likely occupy more than half of the queue. Setting $\max_{th}$ to $2N_{max}$ allows $N_{max}$ or higher number of PEP packets in the queue. Hence, in terms of bytes, we employ the following expressions for $\min_{th}$ and $\max_{th}$:

$$\min_{th} = S \cdot \max(5, 0.5\bar{N}_p), \quad (20)$$

$$\max_{th} = S \cdot \min(N_q(\tau), 2 \cdot N_{max}) \quad (21)$$

To have more stable queue we let $\min_{th}$ and $\max_{th}$ be increasing functions so they always stay at the maximum value during the EPIQ-RED operation. In the Simulation section below, we show the stability of our proposed AQM algorithm.

The algorithm works by evaluating $p_a$ for every incoming packet. If the packet that is marked to be dropped is a Partially Erased Packet (PEP), the packet is enqueued and N PEP packets are randomly selected from the queue by using the virtual list and are partially erased. If it is not a PEP packet, the packet is dropped. Thus, we guarantee fairness between the different data types of traffic in the queue.

Transmission Rate Control

The channel between the sender and the receiver should be monitored to ensure high-quality video delivery. Because of the changing condition of the network, rate control is necessary to maintain quality video streaming while ensuring fairness to other competing real-time and non-real-time sessions. Based on the reported available bandwidth, the sender adjusts the sending rate of the video stream. In general, the rate control mechanism that is used in video transmission either relies on the traditional Transmission Control Protocol (TCP) or multimedia oriented TCP friendly protocols. Each has its own advantages and disadvantages.

The most popular video streaming mechanism, DASH, employs HTTP/TCP to transport video over the network. The video rate is adjusted according to reported available bandwidth by TCP. Other methods include Real-time Transport Protocol (RTP). Several congestion control mechanisms were proposed to be used in conjunction with RTP, like TFRC [See, Floyd, S. et al, Equation-based Congestion Control for Unicast Applications, *Proceedings of the Conference on Applications, Technologies, Architectures, and Protocols for Computer Communication*, ACM, 43-56], GCC [See, Kelly, F. P., et al, 1998. Rate Control for Communication Networks: Shadow Prices, Proportional Fairness and Stability. *The Journal of the Operational Research Society* 49, 3: 237-252] and Kelly. [See, De Cicco, L. et al, 2013. Experimental investigation of the google congestion control for real-time flows. *Proceedings of the 2013 ACM SIGCOMM workshop on Future human-centric multimedia networking*, ACM, 21-26.]

Equation based congestion control methods are the most widely used with RTP. Protocols like Datagram Congestion Control Protocol (DCCP) and TCP-friendly Rate Control Protocol (TFRC) are well known RTP solutions. The congestion algorithm can be implemented as an application that uses UDP as a transport layer. Equation based control protocols use TCP response function to estimate the sending rate:

$$T = \frac{S}{R\sqrt{\frac{2p}{3}} + t_{RTO}\left(3\sqrt{\frac{3p}{8}}\right)p(1 = 32p^2)} \quad (22)$$

where T is the sending rate in bytes/sec. while S, R, p and $t_{RTO}$ are the packet size, round trip time, study state loss event rate and TCP retransmission timeout, respectively. The loss event is defined as a packet loss within single Round Trip Time (RTT).

Since our disclosed solution does not drop whole packets but partially erase them, using a multimedia oriented rate control protocol is easier to implement. It is possible to employ TCP in conjunction with the EPIQ framework. However, mapping partially erased packets into equivalent conventional a packet loss model is a complex task. Our objective is to employ a rate control algorithm that achieves fairness with other flows that share the network resources yet is compatible with our novel solution. Hence, we disclose here a modified TCP-Friendly Rate Control protocol (TFRC) and refer to it EPIQ-TFRC. The TCP response function (Eq. (22)) is used by TFRC to achieve TCP-friendly sending rate that maintains fairness with other TCP flows in the network. In our disclosed solution, evaluating the round trip time R and TCP time-out tRTO works well with the proposed methods that are used in the TFRC standard. However, evaluating the loss-event rate p is not straightforward. Since we only drop portion of the partially erased packets, using the proposed methods for the TFRC protocol without proper modifications will not work with the EPIQ framework. We develop a loss-event rate p mapping method that converts the partial packet erasing to a packet loss.

In a conventional network, packet dropping is considered an indication of congestion. Meanwhile, in our solution we drop only portion of the packets to signal congestion. The total number of bytes that are lost is the same under both our proposed method and conventional streaming. Our suggested event loss rate p. mapping is calculated such that we achieve fairness with other TCP flows in the network. In order to achieve fairness we convert the partial packet loss to its equivalent packet loss model that is used in the original TFRC.

Figure 5:
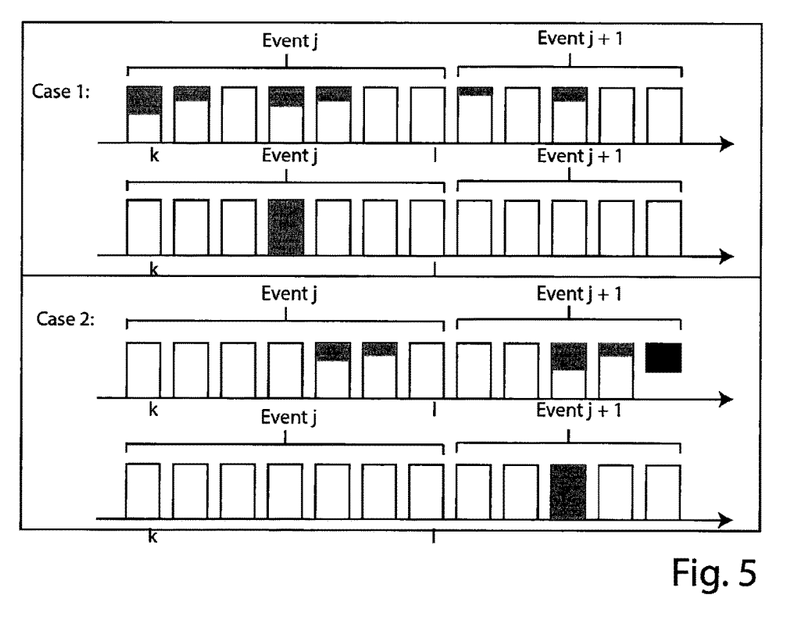
FIG. 5 is a chart showing the process of mapping partial loss to packet loss, illustrating two exemplary cases.

FIG. 5 illustrates the process of mapping partial packet losses to a complete packet drop within a loss-event. As mentioned above, a loss-event (or simply an event) is associated with a window of time that is equal to a Round-Trip-Time (RTT). There are two cases. In the first case, the sum of the lost portions is larger than the average packet size. In such case, a packet loss is indicated at the middle of the event. In the second case, the sum of the lost portions is less than that of the average packet size. Here, a packet lost is not indicated and the amount of partial lost data is transferred to the next loss event. In the next loss event, the carried lost portion is added to the current event sum of lost portions. Similarly, if the sum is less than a packet, then a packet loss is indicated at the middle of the event otherwise it is carried out to the next loss event. The carry-on of partial packet loss can be carried on to one loss event further than it was originated not further future events.

Let's assume event j starts at packet k and ends at packet l; and let $x_j$ be the sum of the lost packets' portions in event j measured in packets. Also, let $y_j$ be an indication function of packet loss at $(k+l)/2$ for event j. In addition, $r_{j-1}$ is the reminder of sum of lost packet in event j−1.

$$y_j = \begin{cases} 1 & \text{if } r_{j-1} + x_j \geq 1 \\ 0 & \text{if } r_{j-1} + x_j < 1 \end{cases} \quad (23)$$

And $$r_j = \begin{cases} 0 & \text{if } r_{j-1} + x_j \geq 1 \\ x_j & \text{if } r_{j-1} + x_j < 1 \end{cases} \quad (24)$$

Where $$x_j = \frac{\sum_{i=k}^{l} \delta_i}{S} \quad (25)$$

where $\delta_i$ is the number of bytes that have been erased from packet i within an event window. The indication function $y_j$ will indicate that the packet loss is equal to one or more.

Since TCP only reacts to one packet loss per window, we only indicate one packet loss in $y_j$. After converting the partial packet erasing to packet loss, we use Exponential Weighted Moving Average (EWMA) to compute the packet event loss p [See, Floyd, S. et al, Equation-based Congestion Control for Unicast Applications, Proceedings of the Conference on Applications, Technologies, Architectures, and Protocols for Computer Communication, ACM, 43-56.] However, the standard TFRC/RFC 5348 protocol uses Average Loss Interval (ALI) method to compute the event loss rate p. ALI response to network changes is better than EWMA. On the other hand, under EPIQ, we observed that EWMA provides smother video transmission than the ALI averaging method.

Since the packet size S in the TFRC standard is fixed, our solution has to be adaptable to such scenario. One possible resolution to this constraint is to pad the tail of a packet with zeros in case the packet is less than the desired packet size S. Because the zero padding is at the tail of the packet, the padding is first dropped during congestion. This method can be enforced on all EPIQ packets to provide extra protection to video slices during heavy congestion.

Simulation

In this section, we present the simulation results of our EPIQ system including EPIQ-RED stability, EPIQ-TFRC rate control and most importantly video transmission quality, and we compare the performance of EPIQ with leading approaches.

Simulation Setup

Figure 6:
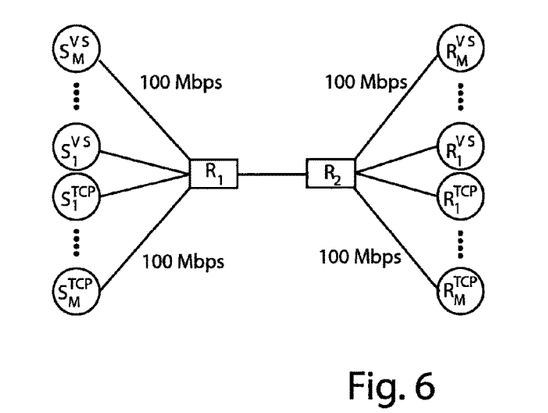
FIG. 6 is a topology diagram used for our simulation analysis of the EPIQ framework.

We used the ns-2 simulator to implement the EPIQ framework. As depicted in FIG. 6, we use the widely used bar-bell topology with multiple video and TCP sources connected to a single bottleneck link. In our experiments, the capacity of the bottleneck link and queue size is set to 10 Mbps and 45 packets respectively; unless stated otherwise, the rest of the links are fixed to 100 Mbps.

In our simulations, the traffic is generated by two equal member groups; each group has 10 sources (users). To simulate long live TCP session, the first group is setup as FTP/TCP traffic generator while video streaming applications are set as the second traffic group. Also, both applications send packets with the same size of 1500 bytes. Hence, matching numbers of FTP and video sessions are sharing the bottleneck link.

For the video content, we used the Scalable Video-streaming Evaluation Framework (SVEF) to generate trace files for our simulations, convert the trace files to compatible ns-2 simulator video interface, and to evaluate the received video quality. The CIF foreman video sequence, encoded at 30 FPS using a GoP G16 structure, was used. Since the sequence is only 10 seconds, we retransmitted it to simulate longer video durations. The SVC video stream consists of one base layer and six enhancement layers. The video supports the following quality profiles: 210, 260, 310, 350, 380, 430 and 450 Kbps for layers 0 to 6, respectively. To evaluate the performance of our system, we compare it with commonly used video streaming methods. In all cases, we used the simulation setup described above unless mentioned otherwise. In the following subsection, we discuss the configuration related to each system.

EPIQ

Our disclosed EPIQ video streaming system was configured according to the findings of the mathematical model in the Stochastic Model section above. Recall that in the Active Queue Management section above we discussed the method that we suggested to maximize the number of PEP packets that are selected during congestion. In our simulations, each SVC frame represents one EPIQ video set (EVS), and it was carried by one EPIQ packet set (EPS). EPIQ-TFRC selects the appropriate video transmission rate (video quality profile) by calculating the running average of sending bitrate using:

$$\hat{R}_{bps} = \begin{cases} a\hat{R}(i-1) + (1-a)R(i) & i > 1 \\ R(1) & i = 1 \end{cases} \quad (26)$$

We used a=0.8 in our simulation. $\hat{R}$ (i) represents the average sending rate at event i where, here, the event duration is 10 seconds. Also, reducing the quality profile of the video is allowed only if the playback buffer size is less than 5 seconds. Hence, based on the running average and the playback buffer size, the closest video quality profile is selected. EPIQ-RED and EPIQ-TFRC were preconfigured to the ns-2 default parameters.

Multi-Queue

Multi-based video streaming is the prominent traditional solution to benefit from the priority structure of video. Our multi-queue comparison model is based on DiffServ. The AQM for DiffServ employs two sets of queues. The first set of queues is for streaming data and the second set, which consists of a single queue, is used for FTP data. The multimedia queue set is divided into three virtual queues (designated here as Green, Yellow and Red) with each having different dropping precedence. The most important video traffic is queued in the Green queue while the least important is queued in the RED queue. At the sender, the SVC video stream was divided into three different priority streams. We used a simple packet marking method where the packets are marked based on the carried video layer. The SVC base layer and six enhancement layers were divided into three streams according to the layer priority and bitrate. Also, to control the video sending rate we used standard TCP Friendly Congestion Control (TFRC) protocol. Similar to the EPIQ system, the SVC quality profile was selected in a similar manner. The system used the default ns-2 TFRC and DiffServ parameters.

HTTP Streaming

Nowadays, one of the most widely used video streaming algorithm is Dynamic Adaptive Streaming over HTTP (DASH). DASH video traffic is streamed over best effort Internet. Hence, and similar to other recent works studying DASH performance, in our simulations, Drop Tail was used as the AQM algorithm in the bottleneck network. At the sender, The H.264 SVC video Quality profiles (210, 260, 310, 350, 380, 430 and 450 Kbps) were used as DASH supported bitrates for the Forman video stream. In standard DASH, data are transported using TCP, which provides bandwidth estimate to the application layer to adjust the sending rate accordingly. We used the DASH standard method to control the selected video bitrate. DASH streaming philosophy is different from both EPIQ and DiffServ.

Comparing between the three systems was based on the overall video delivery performance. To improve performance we increased the chunk size from 5 seconds to 15 seconds. Most importantly, since we know the available bandwidth, we set the video quality to the highest (i.e. 450 Kbps) as it will lead to more fair network sharing results. We refer here to this modified DASH as DASH-M and to the standard DASH by DASH-S. Because in most cases, both versions, standard and modified, have virtually the same performance, we will label the performance results of these cases simply as "DASH". In cases when the performances of DASH-M and DASH-S differ, we will make that distinction clearly and show the performances of both scenarios of DASH.

Simulation Results

In this section we present the results of our experiment with regard to AQM stability, fairness and convergence, and video transmission quality.

AQM Stability

Figure 7:
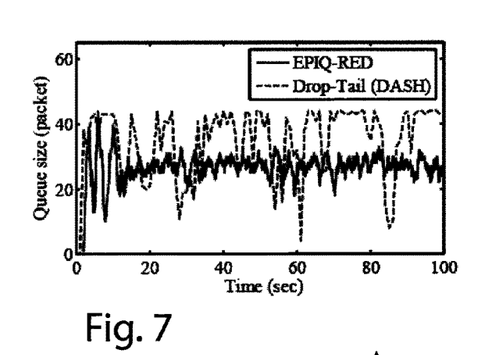
FIG. 7 is a series of graphs plotting instantaneous queue size (packet) as a function of time for the EPIC-RED and Drop-Tail (DASH) cases.

Our EPIQ-RED algorithm shares the core principles of RED. FIG. 7 shows the instantaneous queue size of EPIQ and DASH. According to Eq. (20)-(21), $min_{th}$ and $max_{th}$ are set automatically to 5 and 38 packets, respectively, while the average queue size is 30. The data show that our algorithm is relatively stable in comparison to what is found in the literature and consistent with RED performance. However, the performance of DASH Drop Tail is unstable. For DiffServ, the performance of the multi-queue is similar to our proposed system; which conforms to standard RED performance. To achieve more stable EPIQ-RED queue, a larger queue is necessary; however, that will increase the packet delay which is not recommended.

Another goal of AQM is to maximize channel utilization. All systems achieved full channel utilization in our simulations.

Fairness and Convergence

Congestion control is necessary to achieve smooth video streaming while maintaining fairness with other flows in the network. Unlike conventional systems, EPIQ does not signal congestion by dropping packets. Hence, we need to validate the performance of our proposed method of calculating the event-loss rate p, which is a critical component of our congestion control.

Figure 8:
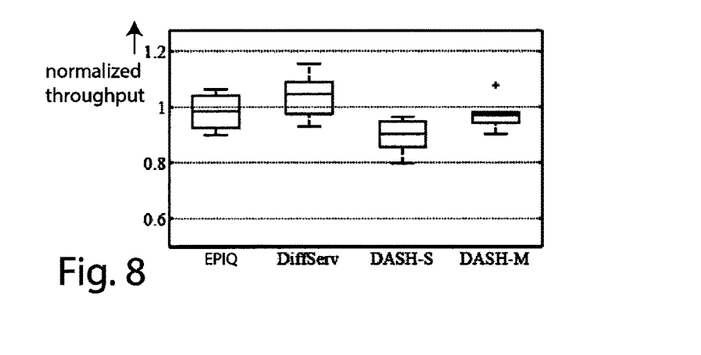
FIG. 8 is a graph comparing fairness of the respective EPIQ, DiffServ, DASH-S and DASH-M schemes when competing with TCP; the graph plots normalized throughput (on the vertical axis) for each of the respective algorithms.

Fairness is an important requirement to every congestion control. FIG. 8 illustrates the fairness of the proposed EPIQ-TFRC when competing with TCP traffic, where 10 FTP users share the bottleneck link with similar number of video users. The graph shows the statistical distribution of video users throughput normalized to the bottleneck fair share. For a 100 second simulation, the average share ratio after 10 seconds are, 0.98, 1.05, 0.90 and 0.97 for EPIQ, DiffServ, DASH-S and DASH-M respectively. It is clear that DiffServ-TFRC and EPIQ-TFRC connections provide a higher level of fairness toward FTP-TCP than DASH-S.

Although EPIQ and DiffServ share the TFRC core principles as mentioned earlier, DiffServ loss-event p is calculated using the Average Loss Interval (ALI) method. ALI improves both the sending rate response and the overall fairness under changing network conditions when compared with EWMA. However, during our simulation we found out that EWMA is more suitable to our proposed congestion algorithm. The explanation for this observation is the following.

Figure 9:
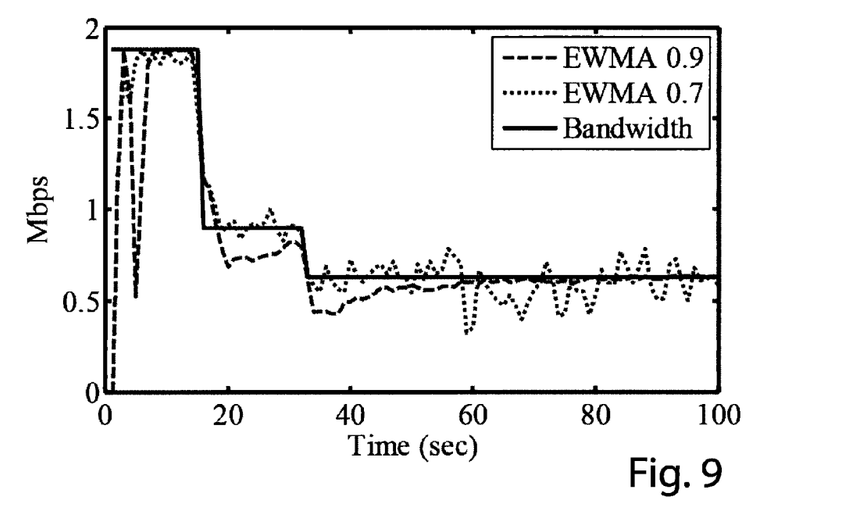
FIG. 9 is a graph illustrating convergence between two different EWMA coefficients (0.9 and 0.7) as compared to bandwidth; the graph plotting Mbps as a function of time.

Our utilization of the carry-on packet loss approach (as explained earlier in the above Transmission Rate Control section) leads to delaying the system response to the next loss event, and in return, the rate control algorithm delays the reduction in the sending rate to the following time window. This causes the AQM algorithm to react to non-responding flows aggressively, which leads to a saw-like sending rate. The recommended EWMA coefficient is 0.7 for TFRC. Thus for EPIQ-TFRC we conducted several experiments with different EWMA coefficient values. For example, FIG. 9 shows rate convergence of two video connections with two EWMA coefficients of 0.7 and 0.9 compared with fair share bandwidth. It is clear that increasing the coefficient value slows the response to congestion. However, increasing the EMWA coefficient value decreases the fairness among the video flows and fairness toward other applications as well. In the FIG. 9 example, it is found that when EWMA coefficient is 0.7, the two connections share the traffic equally 50% each (i.e fair normalized throughput is 1), whereas when the coefficient is set to 0.9, the fair normalized throughput is reduced from 1 to 0.9. Thus there is a clear design issue which involves balancing fairness and smoothness. During our simulation, we set EWMA 0.9. On the other hand, DASH-S has the lowest level of fairness among all systems that we simulated. This fairness issue is a well-recognized phenomenon with HAS. Meanwhile, our simulations show that DASH-M fairness matches EPIQ in terms of network resources sharing; hence, DASH-M is certainly an improvement over the standard DASH (DASH-S). Despite the fact that we introduce changes to the original TFRC work, we find our system operates within TFRC boundaries.

Video Transmission Quality

One goal of the disclosed system is to provide high quality video transmission. The performance metrics used to evaluate the quality of the received video traffic include the average Peak Signal to Noise Ratio (PSNR) of the luminance (Y) component, frame loss ratio, delay and video playback performance. In our simulations, retransmissions were allowed only for the base layer of the SVC video for both EPIQ and DiffServ. Meanwhile, the retransmission function was allowed for all DASH packets, which include both control packets and video streaming packets because of the necessity of all packets to DASH operation. It is worth pointing out that if the retransmission function were disabled for DASH, we would expect very degraded results similar to those found in the above section describing the Stochastic Model for the Best Effort (BE) case, where a very high percentage of the received video data would not be useful to the decoder.

Figure 10:
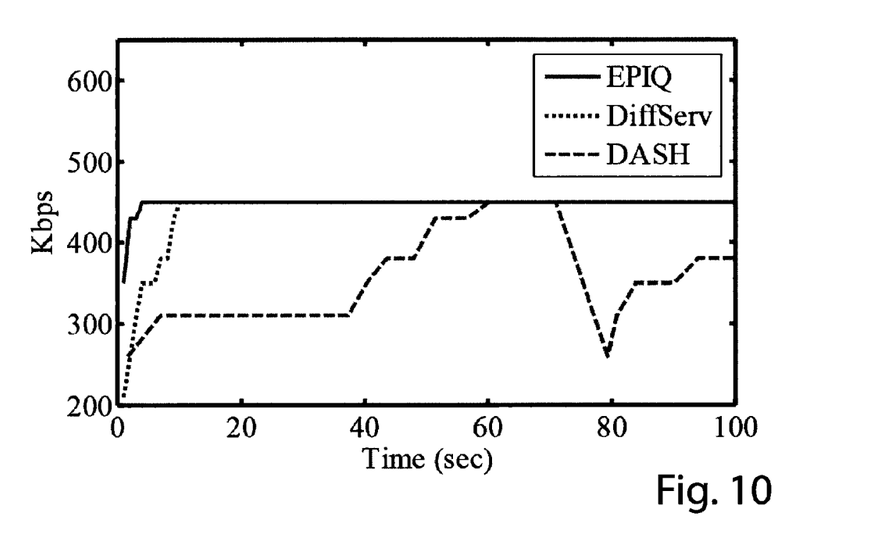
FIG. 10 is a graph comparing video quality profile changes for a particular user for EPIQ, DiffServ and DASH; the graph plotting Kbps as a function of time.

We tested our disclosed solution and computed the average results for the performance metrics that we stated earlier. All results (unless stated otherwise) represent the average per user over 100 seconds, where this average is evaluated over 10 video sessions corresponding to the 10 users in our simulations. As an illustration for the user rate selection process, FIG. 10 shows the video quality profile that is selected by the three mechanisms for one particular user. Based on the video rate selecting mechanisms (EPIQ, DiffServ, and DASH) that we discussed in the above Simulation section, both EPIQ and DiffServ select the highest quality video almost throughout the simulation time, unlike DASH (DASH-S), which it suffered from video quality profile oscillation.

Figure 11:
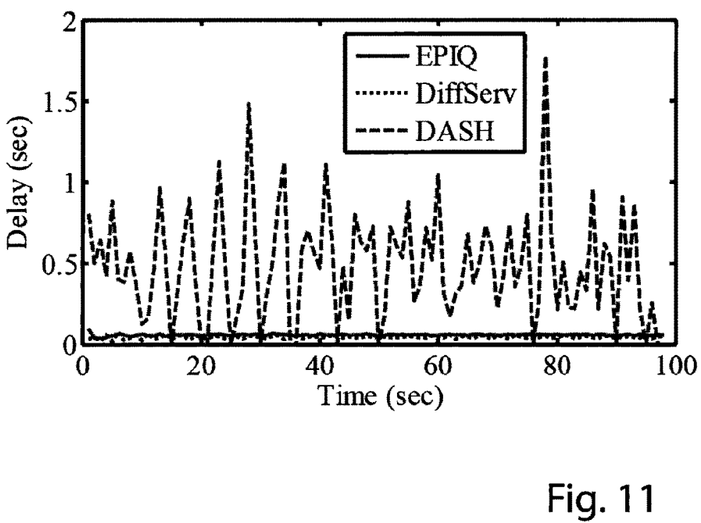
FIG. 11 is a graph showing application to application data delay for a particular user for EPIQ, DiffServ and DASH; the graph plotting Delay (in seconds) as a function of time.

Another important performance parameter is application to application data delay. As an illustration, FIG. 11 shows the delay of the three mechanisms as seen by a particular user application layer. EPIQ delay is slightly higher than DiffServ because the EPIQ receiver forwards the received data to the application after receiving all EPS's packets. DASH (both versions) on the other hand, has a very high delay because it relies on TCP to deliver data. Both the packet retransmission process and the TCP buffer contribute to the delay. A further details about the overall systems delay and jitter performance are depicted in Table 2.

TABLE 2

EPIQ, DiffServ and DASH transmission results

|  | Delay (sec) | Delay Jitter (sec) | Retransmit (%) frames | Frame Loss (%) Receiver | Frame Loss (%) Decoder |
| --- | --- | --- | --- | --- | --- |
| EPIQ | 0.06 | 0.006 | 0.2 | 8 | 11 |
| DiffServ | 0.056 | 0.01 | 1 | 9 | 16 |
| DASH | 0.48 | 0.34 | 5.3 | — | — |

Similar delay results can be found in delay jitter where DASH has the highest jitter due to the TCP AMID mechanism. It is well known that push-based methods such as RTP, which uses multimedia protocol like TFRC, offer high quality multimedia transmission. It meets the high QoS requirements of applications like live streaming. On the other hand, pull-based methods like DASH are suitable for low QoS requirement applications like Video on Demand (VoD). Regarding retransmission, EPIQ only retransmitted 0.02% of the video frames while DiffServ retransmitted 1% of the frames. Because DASH uses HTTP/TCP, it retransmitted 5.3% of video frames.

Finally, the frame loss ratio at both the receiver and at the decoder is also shown in Table 2 for EPIQ and DiffServ. The difference between the two loss values shows the effectiveness of the dropping strategy. In EPIQ, only 3% of the received data are not useful to the decoder. However, under DiffServ 7% of the data were useless. It is clear from the results that EPIQ delivers more useful packets to the decoder than DiffServ. Since DASH retransmits all of its lost packets, we did not include it in Table 2.

Video playback quality and performance is vital to the users. Table (3) shows the performance of the different video transmission mechanisms from the user prospective with startup buffering of 5 seconds.

TABLE 3

EPIQ, DiffServ DASH-S and DASH-M Video Player Results

|  | Quality Change | Number of Stalling | Stalling Duration (sec) | PSNR (dB) |
| --- | --- | --- | --- | --- |
| EPIQ | 2.3 | 0 | 0 | 35.5 |
| DiffServ | 2.5 | 0 | 0 | 34.4 |
| DASH | 7.4 | 0.8 | 0.25 | 28.3 |
| DASH-M | 0 | 7.2 | 6.7 | N/A |

It is important to highlight that EPIQ achieves 7.2 dB in PSNR improvements over DASH-S. Further, EPIQ even outperforms DiffServ by more than 1 dB. More importantly, by considering other key QoE metrics, EPIQ has a clear advantage. Regarding video quality-profile changes (which correspond to bitrate changes), DASH-S suffers from almost three times the quality changes when compared to both EPIQ and DiffServ. On the other, DASH-S achieved relatively a small number of stalling events (freeze frames) with an average stalling duration of 0.25 seconds per user. Meanwhile, DASH-M suffers from 7.2 stalling times (per user) with a total stalling time of 6.7 seconds. Note that neither EPIQ nor DiffServ suffer from any stalling. It should be clear from these results the importance of quality/bitrate adaptation (used by EPIQ, DiffServ and DASH-S but not by DASH-M), Such bitrate changes are necessary to avoid video stalling. (During the stalling time, the video playback stops for buffering.) That makes DASH-M unsuitable as a viable solution for video streaming. Hence, measuring the PSNR metric for DASH-M is not applicable in this case due to the large number of freeze-frame and stalling events. Table 3. EPIQ, DiffServ DASH-S and DASH-M video player results.

In this disclosure, we describe a novel approach, Erasable Packets within Internet Queues (EPIQ), for video streaming. EPIQ provides high quality video transmission with minimal network complexity. Under congestion, EPIQ works by erasing portions of multiple video packets within a network queue rather than the conventional packet dropping mechanism. We further describe an analytical model for our disclosed solution and verified it using simulation. We further introduced EPIQ-RED AQM, based on the well know RED algorithm, to implement our partial packet erasing. Furthermore, to maintain fairness and to control the rate of competing video streams, we presented EPIQ-TFRC. Our simulation results show that our system can achieve better performance than both multi-queue and HTTP-based video streaming. In summary, the disclosed EPIQ solution introduces a new paradigm in video streaming by partially erasing packets to control congestion in the network while maintaining the highest video transmission quality.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A router circuit for handling incoming packets of streaming media including packets that are encoded as collections of progressively priority-ranked segments and packets that are encoded without said progressively priority-ranked segmentation, comprising:
    a processor configured to receives quality of service data representing condition of network congestion; and
    said processor programmed to test an incoming packet in the streaming media to determine whether it is encoded as collections of progressively priority-ranked segments;
    said processor further programmed to reduce network congestion when the received quality of service data indicates presence of network congestion by:
    (a) selectively and progressively erasing segments within the incoming packet beginning with a lowest-ranked priority segment if the incoming packet is determined to be encoded as collections of progressively priority-ranked segments; and
    (b) dropping the entire incoming packet if the incoming packet is determined not to be encoded as collections of progressively priority-ranked segments.

2. The router circuit of claim 1 wherein the processor maps selectively erased segments within a given packet to a dropped packet equivalent by maintaining a record of a sum of selectively erased segments and mapping those selectively erased segments as being equivalent to a dropped packet when the sum of the selectively erased segments is greater than an average packet size.

3. The router circuit of claim 1 wherein the processor maps selectively erased segments within a given packet to a dropped packet equivalent by maintaining a record of an accumulated sum of selectively erased segments across plural frames and mapping that accumulated sum of selectively erased segments as being equivalent to a dropped packet when the accumulated sum of the selectively erased segments is greater than an average packet size.

4. The router circuit of claim 1 wherein the processor is programmed to store a plurality of incoming packets in a queue, flag select packets from the plurality of incoming packets, construct a list of the select packets in memory and selectively and progressively erasing segments across the select packets, where the select packets are encoded as collections of progressively priority-ranked segments.

5. A streaming media encoding and routing system comprising:
    an encoder circuit that constructs a streaming media sequence as a plurality of sequential frames, each frame comprising a plurality of segments;
    the encoder circuit that is programmed to place media information into the plurality of segments of each frame according to a predefined priority and further programmed to order the sequence of said segments within each frame such that the segments are progressively priority-ranked from high priority to low priority;
    a processor configured to receive quality of service data representing condition of network congestion; and
    said processor programmed to test an incoming packet in the streaming media to determine whether it is encoded as collections of progressively priority-ranked segments;
    said processor further programmed to reduce network congestion when the received quality of service data indicates presence of network congestion by:
    (a) selectively and progressively erasing segments within the incoming packet beginning with a lowest-ranked priority segment if the incoming packet is determined to be encoded as collections of progressively priority-ranked segments; and
    (b) dropping the entire incoming packet if the incoming packet is determined not be encoded as collections of progressively priority-ranked segments.

6. The system of claim 5 wherein the processor maps selectively erased segments within a given packet to a dropped packet equivalent by maintaining a record of a sum of selectively erased segments and mapping those selectively erased segments as being equivalent to a dropped packet when the sum of the selectively erased segments is greater than an average packet size.

7. The system of claim 5 wherein the processor maps selectively erased segments within a given packet to a dropped packet equivalent by maintaining a record of an accumulated sum of selectively erased segments across plural frames and mapping that accumulated sum of selectively erased segments as being equivalent to a dropped packet when the accumulated sum of the selectively erased segments is greater than an average packet size.

8. The system of claim 5 wherein the processor is programmed to store a plurality of incoming packets in a queue flag select packets from the plurality of incoming packets, construct a list of the select packets in memory and selectively and progressively erasing segments across the select packets, where the select packets are encoded as collections of progressively priority-ranked segments.

9. A method of reducing congestion within a streaming media network comprising:

receiving a streaming media sequence as a plurality of incoming packets, wherein at least a portion of the packets are encoded such that in each packet a plurality of segments that contain media data have been progressively priority-ranked from high priority to low priority;

receiving a quality of service data indicative of condition of network congestion;

testing an incoming packet in the streaming media to determine whether it is encoded as collections of progressively priority-ranked segments; and using a processor to reduce network congestion when the received quality of service data indicates presence of network congestion by:

(a) selectively and progressively erasing segments within the incoming packet beginning with a lowest-ranked priority segment if the incoming packet is determined to be encoded as collections of progressively priority-ranked segments; and (b) dropping the entire incoming packet if the incoming packet is determined not to be encoded as collections of progressively priority-ranked segments.

10. The method of claim 9 further comprising using the processor to map selectively erased segments within a given packet to a dropped packet equivalent by maintaining a record of a sum of selectively erased segments and mapping those selectively erased segments as being equivalent to a dropped packet when the sum of the selectively erased segments is greater than an average packet size.

11. The method of claim 9 further comprising using the processor to map selectively erased segments within a given packet to a dropped packet equivalent by maintaining a record of an accumulated sum of selectively erased segments across plural frames and mapping that accumulated sum of selectively erased segments as being equivalent to a dropped packet when the accumulated sum of the selectively erased segments is greater than an average packet size.

12. The method of claim 9 further comprising using the processor to store a plurality of incoming packets in a queue, flag select packets from the plurality of incoming packets, construct a list of the select packets in memory and selectively and progressively erasing segments across the select packets, where the select packets are encoded as collections of progressively priority-ranked segments.

* * * * *